April 29, 1941. C. H. CLARK Re. 21,787

MARINE CRAFT

Original Filed Feb. 8, 1936 3 Sheets-Sheet 1

INVENTOR.
Charles Haskell Clark
BY
Lippincott & Metcalf
ATTORNEYS

April 29, 1941. C. H. CLARK Re. 21,787

MARINE CRAFT

Original Filed Feb. 8, 1936 3 Sheets-Sheet 2

INVENTOR.
Charles Haskell Clark
BY
Lippincott & Metcalf
ATTORNEYS

April 29, 1941. C. H. CLARK Re. 21,787

MARINE CRAFT

Original Filed Feb. 8, 1936 3 Sheets-Sheet 3

INVENTOR.
Charles Haskell Clark
BY Arlington C. White
ATTORNEY

Reissued Apr. 29, 1941 Re. 21,787

UNITED STATES PATENT OFFICE 21,787

MARINE CRAFT

Charles Haskell Clark, San Francisco, Calif., assignor, by mesne assignments, of one-half to Ray H. Kistler, San Francisco, Calif.

Original No. 2,111,555, dated March 22, 1938, Serial No. 62,975, February 8, 1936. Application for reissue June 5, 1939, Serial No. 277,492

14 Claims. (Cl. 9—2)

The invention, in general, relates to manually propelled water crafts which are also adaptable for sailing, as a canoe, and more particularly relates to crafts of the canoe variety commonly termed kayaks.

A primary object of the invention is to provide a kayak capable of quick and ready collapse so that the same may be folded for transportation by road vehicles.

Another object of my invention is to provide a craft of the aforementioned character which is easily, quickly and readily set up for use in the water.

A still further object of my invention is to provide a craft adaptable for folding into a compact unit but which expands when set up to produce a hull of unusually large size for the width of panels employed in its construction.

Another object of the invention is to provide a marine craft of the foregoing character having a stream-line construction thereby affording a maximum amount of speed and offering minimum resistance to wind and water currents.

A still further object of the invention is to provide a marine craft which can be constructed of relatively light-weight material at inexpensive cost and yet which affords a rugged and stable structure.

A still further object of my invention is to provide a marine craft of the aforementioned character employing panels and embodying novel hinge joints between the deck and bottom panels of the craft.

Other objects of the invention, together with some of the advantageous features thereof, will appear from the following description of a preferred embodiment of my invention which is illustrated in the accompanying drawings.

While a preferred embodiment of my invention is shown in the drawings, it is to be understood that I am not to be limited to the embodiment shown, as my invention, as defined in the appended claims, can be embodied in a plurality and variety of forms.

Referring to the drawings.

In its preferred form, the marine craft of my invention preferably comprises a pair of complementary sections which together, when set up, constitute the hull of the craft including a deck and a bottom; each of said sections consisting of a pair of complementary panels, a first hinge connection joining each pair of panels of each section and partially joining the two sections, a second hinge connection joining the deck and bottom panels of the two sections; all of said connections being formed of a flexible material so that the craft is collapsible and the sections are foldable upon one another, and the second connection being adapted to be stretched and maintained taut while the craft is in the water, together with retractable means for tautening said second connection thereby setting up the craft for use.

In accordance with my invention, I provide four panels 11, 12, 13 and 14 which preferably are fabricated of plywood but which, if desired, can be fabricated of any other suitable lightweight material, such as water-proof pressed paper or sheet spring metal. These materials are all pliable and are adapted to be bowed so as to provide stream-line contours for the craft. The panels 11 and 12 are joined together to form one section of the craft while panels 13 and 14, when joined, form the remaining section, the two sections being complementary so that when the two sections are joined together they constitute the hull of the kayak in which panels 11 and 13 form the deck and the panels 12 and 14 form the bottom of the craft.

Figures 1, 2, 3:
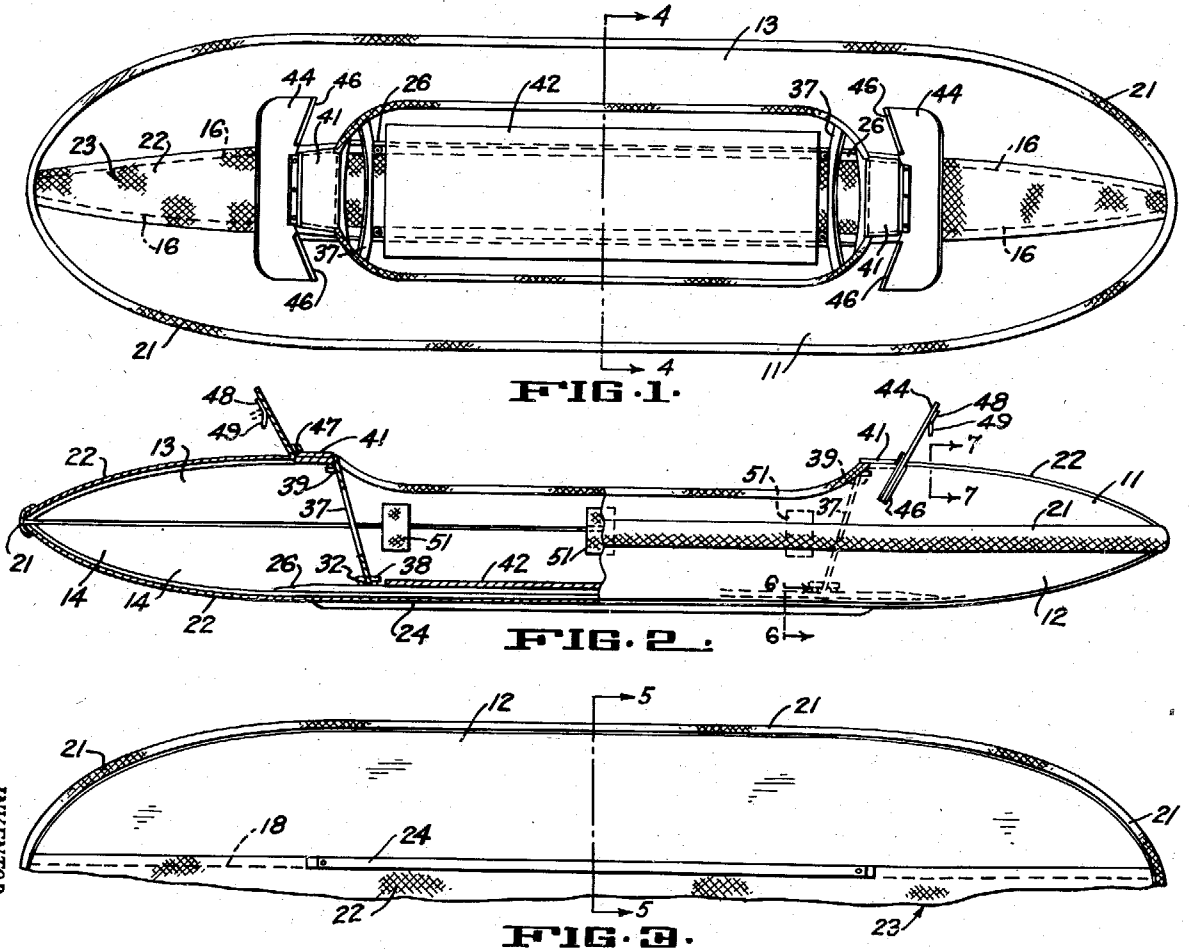
Figure 1 is a plan of an embodiment of the invention.
Figure 2 is a side elevation of the embodiment shown in Figure 1, parts being broken away to show the construction.
Figure 3 is a side elevation of the embodiment illustrated in Figure 1, this view showing the embodiment in a folded or collapsed condition.

As illustrated in the drawings, panels 11 to 14 inclusive are alike in configuration and contour, except for cut away portions of the deck panels 11 and 13 defining the cockpit, thus providing complementary sections for the boat. Preferably, panels 11 and 13 are so formed that each is provided with a straight inner edge 16, except for the cockpit formed therefrom, but which are curved when the craft is set up. See, in this connection, Figure 1 of the drawings. Moreover, the panels 11 and 13 are each provided with an outer edge 17 which is rounded on its outer surface and which is curved at its longitudinal extremities, both when the craft is collapsed and when set up, as illustrated in Figures 1 and 3 of the drawings.

Figure 9:
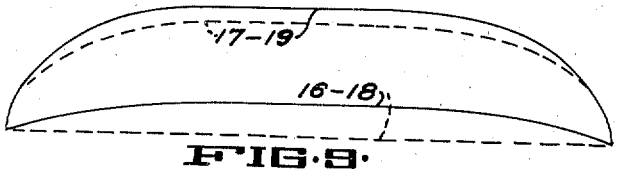
Figure 9 is a diagrammatic and geometric plan view of one of the sections forming the embodiment of the invention.
Figure 11:
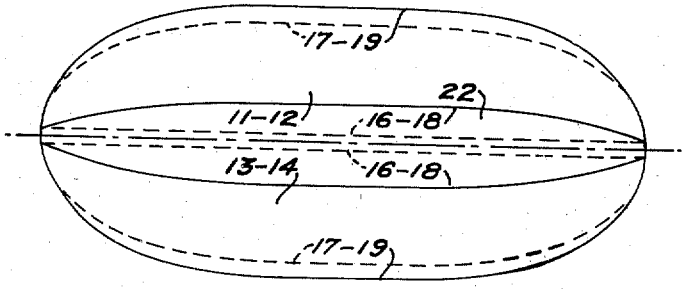
Figure 11 is a diagrammatic and geometric plan view of the two sections forming the embodiment of my invention which is shown in Figure 1.

Panels 12 and 14, which together form the bottom of the craft, are so formed that each is provided with an inner edge 18 which is preferably straight throughout its entire length when the craft is collapsed, see dotted line showings of Figures 9 and 11 of the drawings, but which becomes curved at its longitudinal extremities when the craft is set up, see full line showings of Figures 9 and 11 of the drawings. Moreover, the panels 12 and 14 are each provided with an outer edge 19 which is rounded on its outer surface and which is curved at its longitudinal extremities both when the craft is collapsed and when set up. The curvature of the longitudinal extremities of the outer edges 19 of panels 12 and 14 conforms to the curvature of the longitudinal extremities of the outer edges 17 of the panels 11 and 13, all as illustrated in Figures 1 and 3 of the drawings.

In joining the four panels together to provide the hull of the boat, I preferably utilize strips of water-proof, flexible material and I have found that strips of canvas effectually serve this purpose. Preferably, the strips of canvas are so applied and fastened to the outer surfaces of the panels that hinge connections are provided. To effect this result, and as particularly illustrated in Figures 4 and 5 of the drawings, I fasten a strip of canvas 21, by means of a suitable water-proof adhesive, to the outer surfaces of the panels at their outer edges 17 and 19 respectively. My preferred manner of providing the hinge connection hereinabove mentioned is to bevel or round the outer edges 17 and 19 of the panels 11 to 14 inclusive in such a way that when the craft is set up for use in the water no portion of the edges 17 and 19 is caused to extend beyond a vertical line *v—v* drawn through the point of contact of the inner surfaces of edges 17 and 19 of the panels of each section, or the apex of the angle formed thereby. See, in this connection Figure 4 of the drawings. The canvas strip 21 is relatively narrow in width and is adhesively fastened to said rounded edges of the panels as well as to the adjacent outer surface of each panel, and extends entirely around the craft for the purpose set forth. As illustrated, the canvas strip 21 hingedly connects the panels of each section at their outer rounded edges and also serves to connect the sections at the ends of the panels.

To complete the connection between the two complementary sections of the hull, I provide another strip of flexible, water-proof material, such as the canvas strip 22 and apply the same by means of a water-proof adhesive to the outer surfaces of the deck and bottom panels of the craft. As illustrated in the drawings, the canvas strip 22 extends from one end of the cockpit over the bow, throughout the full length of the bottom of the hull, and up and over the stern of the craft to the other end of the cockpit. If desired, strip 22 can be cut into three portions and applied to the panels by fastening one portion extending from one end of the cockpit to one end of the boat, one portion to the bottom panels and extending over the bottom, and the third portion from the other end of the boat to the other end of the cockpit. As shown in the drawings, strip 22 is for the most part somewhat wider than strip 21 and its lateral extremities are adhesively secured to the outer surfaces of the bottom panels 12 and 14 at their inner edges 18, leaving a relatively wide, central or slack portion 23 free of the panel surfaces. The lateral extremities of strip 22 are also adhesively secured to the outer surfaces of the deck panels at their inner edges 16, likewise leaving the wide central portion 23 thereof free from the panels. The slack or central portion 23 of the canvas strip 22 is adapted to be stretched taut in setting up the craft and to be maintained in a tautened condition while the craft is in the water. Preferably, the wide central portion of strip 22 is sewed to the strip 21 at the ends or bow and stern of the craft.

Figure 4:
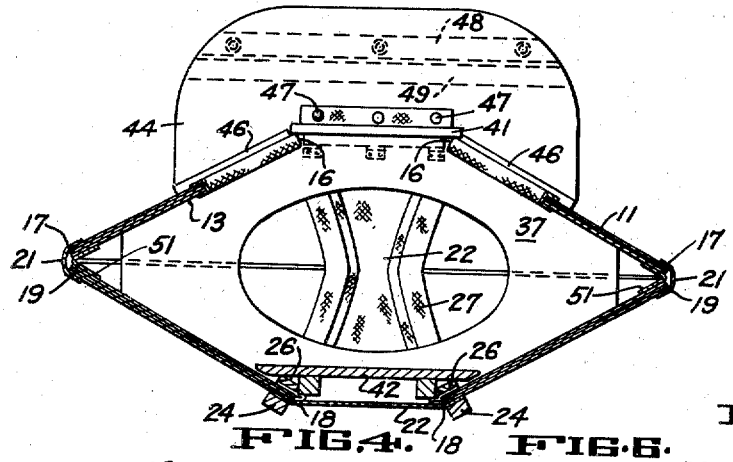
Figure 4 is a view taken on the line 4—4 of Figure 1.
Figure 5:
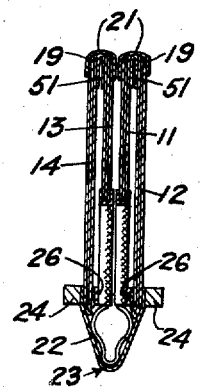
Figure 5 is a view taken on the line 5—5 of Figure 1.
Figure 6:
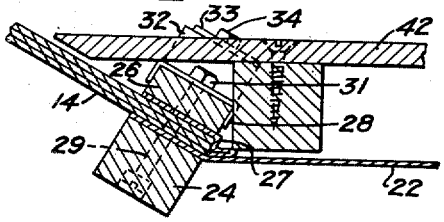
Figure 6 is an enlarged view taken on the line 6—6 of Figure 2.

As illustrated in Figures 4 to 6 inclusive of the drawings, a double keel 24 and accompanying keelsons 26 are provided for the boat. In the present embodiment, keels 24 and keelsons 26 are fabricated of a relatively hard wood, such as oak, the keels 24 being mounted on the outer or under surface of the bottom panels 12 and 14 at their inner edges 18, and the keelsons 26 are mounted on the inner surfaces of the bottom panels opposite to the keels. Preferably, the keels 24 extend along the bottom of the craft for a distance approximately equal to the length of the cockpit or straight portions of the panels 12 and 14, while the keelsons 26 are slightly longer than the keels and preferably are tapered at their longitudinal extremities.

Figure 7:
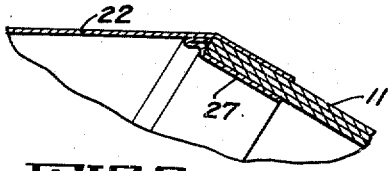
Figure 7 is an enlarged view taken on the line 7—7 of Figure 2.

In Figures 6 and 7 of the drawings, I have shown, in enlarged details, the mountings of the keels and keelsons, together with the means forming the joints therebetween and the panels. As illustrated, a canvas strip 27 is provided on each side of the craft between each keelson and the inner surface of the bottom panels 12 and 14 in order to insure a water-tight joint. The strips 27 extend throughout the full length of the boat on the bottom as well as the deck portions of the panels, one lateral extremity of each strip being adhesively secured to the inner surface of the corresponding bottom panel and the other lateral extremity thereof being sewed to the canvas strip 22. In order to bind the keels and keelsons together, I preferably utilize the means illustrated in detail in Figure 7 of the drawings, which include a channeled metal plate 28 seated on each keelson at both longitudinal extremities thereof. Each channeled plate 28 is pierced at its center by a screw-bolt 29 which also passes through keelson 26, canvas strips 22 and 27, a bottom panel, as well as keel 24, the bolt being countersunk in the keel. A nut 31 is screwed down tightly upon bolt 29 against metal plate 28 and a rubber washer 32 is mounted upon the exposed end of the bolt 29. The rubber washer 32 conveniently is held in position by a small metal washer 33 and a nut 34. These means effectively provide water-tight joints between the panels, the keels and the keelsons.

The kayak of my invention is illustrated in its collapsed condition in Figures 3 and 5 of the drawings. To set up the craft for use in the water requires but the unfolding of the panels and the insertion in the hull of means for lifting and spreading the panels and for holding the flexible, hinge joint 22 in a tautened condition. To effect this result, I provide a pair of retractable spreaders 37 which are disposable fore and aft of the hull and which divide the hull into compartments, including a cockpit. Top and bottom stops are provided for limiting the movement of the spreaders, and as aids in positioning the spreaders in the hull. The bottom stops preferably are eight in number and are arranged in pairs in transverse parallel relationship on the keelsons 26, as shown in Figure 2 of the drawings. Preferably, but four top stops are employed and these are mounted on the under surfaces of the deck panels in transverse parallel relationship and adjacent to the cockpit. The positioning of the top and bottom stops for the spreaders is such that the spreaders 37, when in upright, operative positions, are pushed past the vertical and are disposed at an inclination to the vertical. One bottom stop of each pair thereof conveniently can consist of the rubber washer 32 which is mounted on the exposed end of the screwbolt 29, and the other bottom stop of each pair thereof can consist of a second rubber washer 38 which can be riveted or otherwise rigidly secured to the metal plate 28 on the keelsons 26. The top stops for the retractable spreaders 37 conveniently can consist of four rubber washers 39, similar to the rubber washers 32 and 38, and these are mounted in any suitable manner to the under sides of the deck panels 11 and 13, in transverse parallel relationship but not directly above the bottom stops 32 and 38.

The operation of setting up the spreaders 37 to condition the craft for use in the water comprises placing the spreaders one at a time in the hull between the deck and the bottom panels with the lower edge of each spreader inserted between the two stops of each pair of bottom stops 32 and 38, and then raising the spreaders with their upper edges and sides bearing against the inner surfaces of the panels simultaneously to raise and spread the same and at the same time to tauten the slack, central portion 23 of the canvas strip 22. Each spreader 37 is pushed past the vertical until it reaches and rests against a pair of transversely arranged top stops 39, and in this operative position is inclined from the vertical. It should be observed that the spreaders 37 likewise serve as a back rest for the passengers of the kayak. Each of the spreaders 37 carries a hinge member 41 which is recessed for receiving the edges of the deck panels to thereby center the spreaders in their upright, inclined positions and preventing thereby any lateral displacement of the deck panels 11 and 13 relative to the spreaders while the craft is in the water. To collapse the craft, it is only necessary to pull the spreaders from their upright positions and the panels are then foldable upon one another. To set up the craft, or to collapse and fold the panels together requires less than a minute and can readily be accomplished by anyone, even though unskilled or unfamiliar with marine craft.

Figure 8:
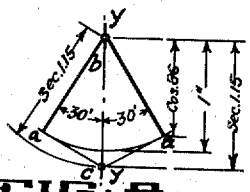
Figure 8 is a diagrammatic and geometric sectional end view of one section of the embodiment of my invention shown in Figure 9.
Figure 10:
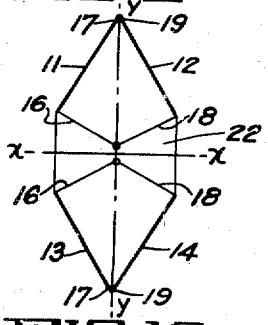
Figure 10 is a diagrammatic and geometric sectional end view of the two sections illustrated in Figure 11.

With specific reference to Figures 8 to 11 inclusive of the drawings, it will be observed that prior to setting up the craft of my invention and when the same is collapsed and laid out on a flat surface without folding the panels upon one another, the inner contacting surfaces of the four panels are coplanar in a longitudinal, horizontal plane $y—y$. Moreover, the inner edges of the panels of each boat section, except for the portions of the deck panels defining the cockpit, are coplanar in a longitudinal, vertical plane $x—x$. Furthermore, the inner edges of the panels of both boat sections, except for the portions of the deck panels defining the cockpit, are contiguous, while the outer edges of the panels of each boat section are contiguous throughout their entire length. See, in this connection, the dotted line showings of Figures 9 and 11 of the drawings. However, when the craft is set up by the positioning of the spreaders 37, it will be observed that the portions of the inner edges of the panels of each section, intermediate the ends thereof, spring away from the plane $y—y$ and, hence, are no longer contiguous. On the other hand, the entire length of the outer edges of the panels of each boat section remain contiguous. Furthermore, all of the edges of the panels, intermediate the ends thereof, spring away from the plane $x—x$. However, inasmuch as the inner edges of all of the panels, when the craft is set up, spring apart in radial directions from a longitudinal medial line through the ends of the panels, both away from the plane $x—x$ and the plane $y—y$, the distance moved by the inner edges is greater than the distance moved by the outer edges from the plane $x—x$. See, in this connection, the geometric showings of Figures 8 and 10 of the drawings, as well as Figures 9 and 11. In Figures 8 and 10, it is shown that assuming a panel width equal to one and an angle of spread, *abc*, of the panels from the plane $y—y$ of 30°, the movement of the outer edges of the panels, which is proportional to the versine of the angle *abc*, is therefore .14 from the plane $x—x$. Correspondingly the movement of the inner edges of the panels, which is proportional to the sum of the versine (.14) of the angle *abc* and the exsecant (.15) of said angle, is therefore .29 from the plane $x—x$. A hull, so formed, is unusually large for the width of panel employed and its structure produces a craft which possesses a maximum amount of buoyancy and stability for its weight, size and compactness, when folded.

Figure 12:
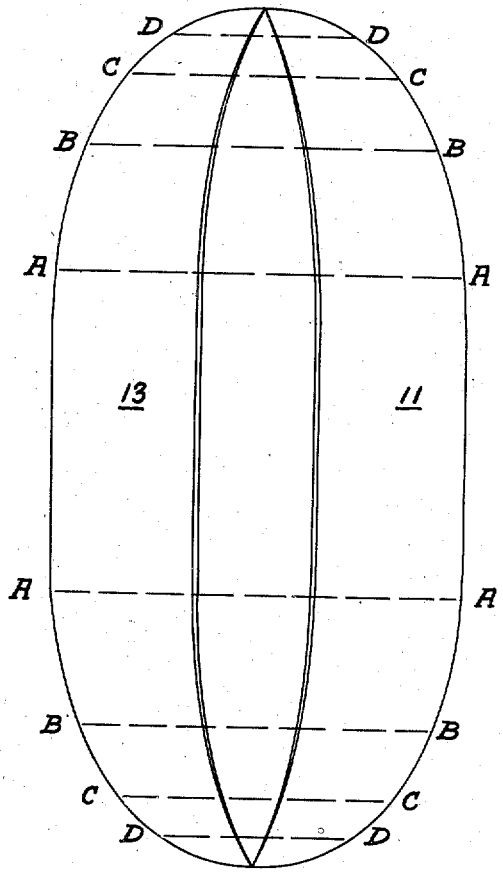
Figure 12 is a plan view of the preferred embodiment of the invention showing the positions of the panels as spread apart when the craft is set up for use in the water, section lines being delineated thereon to indicate the uniform and gradual twist of the panels.
Figure 14:
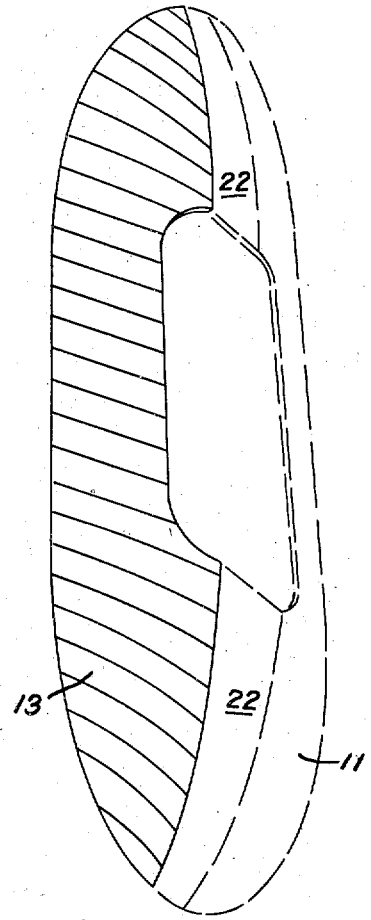
Figure 14 is a perspective view, not including the spreaders or spray deflectors, section lines being delineated thereon to indicate the twist of the panels when the craft is set up.
Figure 13:
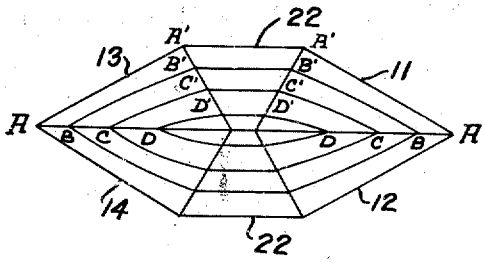
Figure 13 is a diagrammatic end projection of the view of Figure 12 which also illustrates the assumed twists of the deck and bottom panels upon setting up the craft for use in the water.

In the immediately preceding description, I have referred to the spreading apart of the inner edges of the four panels, as well as the movement of the outer edges of the panels, when converting the craft from its folded condition to its set up condition for use in the water. In addition to the foregoing displacement of the panel edges, reference is now made to the twists assumed by the panels 11 to 14 inclusive, together with the bowing thereof, when the spreaders 37 are disposed in the hull and raised to operative position to set up the craft. The unique twisting and bowing features of the panels of my marine craft are particularly illustrated in Figures 12 to 14 inclusive of the drawings whereby it will be observed that each of the panels assumes a twist, when the craft is set up, which is uniform and gradual beginning at the longitudinal center of each panel and extending to each end thereof. Thus, and assuming an angle of spread of 30° between each deck and bottom panel and the horizontal at the longitudinal center of the craft, as indicated by the section lines AA′ of Figure 13 of the drawings, it will be observed that the angle of spread between these panels and the horizontal is materially less than 30° adjacent the longitudinal extremities of the panels.

It is of course to be understood that just prior to the insertion of the spreaders 37 into the hull for setting up the craft, the four panels are in horizontal positions throughout their entire lengths. Upon insertion of the spreaders 37 into the hull and raising the spreaders, the panels are twisted intermediate their ends to an extent dependent upon the extent of spreading apart of the inner edges of the panels. Thus, and with particular reference to Figure 13 of the drawings, the extremities of each panel are but slightly inclined to the horizontal, as indicated by the section lines DD′; and the panels are more inclined to the horizontal as the longitudinal centers thereof are approached, as indicated by the section lines CC′; and are inclined a still greater angle to the horizontal as the longitudinal centers of the panels are more closely approached, as indicated by the section lines BB′; until at the longitudinal centers the angle of inclination to the horizontal reaches a maximum, as indicated by the section lines AA′.

In addition to this twisting of the panels, each of them is slightly bowed adjacent the ends thereof, as indicated by the curvature of section lines BB′; CC′ and DD′ of Figure 13 of the drawings. The degree to which the panels are bowed is dependent upon the degree of twist assumed by the panels, the bowing corresponding to the twisting. Accordingly, as the angle of inclination of the panels with respect to the horizontal is increased with a consequent increased twist of the panels, the bowing of the panels adjacent their extremities is correspondingly increased. Thus, if the angle of inclination of the panels to the horizontal at the longitudinal centers of the panels is greater than 30°, as hereinabove assumed and as illustrated in the drawings, and as such angle of inclination approaches 90°, the bowing of the panels becomes excessive adjacent their extremities since the twist assumed thereby when setting up the craft is materially greater.

In the embodiment of my invention herein illustrated, the flexible joints 21 and 22 between the panels of the hull are so regulated and applied that any tendency towards rupture of the joints when setting up the craft or when in use in the water is reduced to a minimum. Canvas strip 22 is cut to a predetermined width so that the maximum angle of spread between the deck and bottom panel of each section of the craft is substantially less than 90°. Furthermore, canvas strip 21 is cut to a relatively narrow width. Consequently, upon setting up the craft and when the craft is in the water, any external pressure applied against the panels is transmitted directly from one panel to the other of each section because their outer contiguous edges engage one another in their spread apart position. In the present embodiment, I have so regulated the dimensions of canvas strip 22 that the angle of spread between the deck and bottom panel of each section is approximately 60°, more or less. See, in this connection, Figures 8 to 10 of the drawings. In setting up the craft with this angle of spread so controlled and limited, no portion of the panels 11 and 12 on the one hand, or of panels 13 and 14, on the other, or the edges thereof, will protrude or extend beyond a line *v—v* which is drawn as hereinabove referred to, or, in other words, beyond the apex of the angle formed by the inner surfaces of the panels when the craft is set up. See, especially, Figure 4 of the drawings. Hence, there is no tendency of the canvas strip 21 to pull away from the rounded edges of the panels due to any likelihood of the panels to spread from a horizontal plane through the center of the craft, and consequently expose the edges of the panels to moisture.

For the convenience of passengers, I have provided a retractable floorboard 42 which may conveniently be disposed in the cockpit of the craft after the spreaders 37 are in position. In order to prevent water from spraying into the cockpit, I detachably mount a pair of spray deflectors 44 fore and aft of the craft just ahead and just behind the cockpit. The deflectors preferably are supported at an inclination of approximately 60° to the vertical by means of channeled strips 46 fastened to the deck panels, and are held in position by means of extensions of the canvas strip 22 which can be fastened to studs 47 on the deflectors. In order effectively to trap any water that rushes over the bow and stern and strikes the deflectors, I have provided novel traps or hoods on the outer or leading surfaces of the deflectors. These hoods preferably comprise a pair of wooden strips 48 and 49 which extend the full width of the deflector and which have beveled contiguous edges. The strips 48 and 49 are flexibly hinged together by means of a sheet of cloth, or other suitable material, to which the strips are adhesively fastened. The top strip 48 is fastened by means of screws to the deflector leaving the bottom strip 49 free to swing away from the deflector to an extent limited by its engagement with the lower beveled edge of the top strip 48. The swing of the lower strip 49 of the hood is not greater than approximately 90°. The lower edge of the lower strip 49 is slightly beveled so that when water rushes upward from the deck, the strip 49 is readily forced away from the deflector and the water is trapped between the lower strip 49 and upper strip 48.

In order to prevent relative lateral movement of the connected panels of each section upon grasping the panels to collapse the boat, thereby creating a tendency of the panels to pull away from the canvas strip 21, a plurality of relatively small canvas squares or strips 51 may be applied at longitudinally spaced intervals to the inner surfaces of the panels 11 to 14 inclusive at their outer edges. Preferably, in applying the strips 51, the extremities of the strips are glued or otherwise adhesively fastened to the inner surfaces of the panels and the central portions of the strips 51 are sewed to the transverse central portion of strip 21.

While I have described and illustrated herein a collapsible type of kayak incorporating hinged, flexible joints between the several panels forming the hull of the craft, a non-collapsible kayak having similar features and characteristics as the kayak herein shown and described can be constructed of plywood panels, or of papier-mâché, or bisquit, with rigid panels connecting the deck and bottom panels and either with or without the use of ribs.

This application is a continuation in part of my co-pending application, Serial No. 755,760, filed on December 3, 1934 and entitled "Marine crafts."

I claim:

1. A collapsible marine craft comprising a pair of sections hingedly connected together and forming the hull of the craft; each of said sections comprising a pair of pliable panels adapted to be bowed intermediate their ends both laterally and longitudinally, two of said panels constituting the deck panels and the remaining two the bottom panels of the craft; said deck panels being cut away to define the cockpit, outer lateral edges and inner lateral edges on said panels, a first continuous flexible strip fastened to the outer surfaces of the panels of each of said sections and hingedly joining a deck and bottom panel of each section at their adjacent outer lateral edges; said first strip extending entirely around the hull and joining the panels of the two sections at the ends thereof, a second continuous flexible strip extending from one end of the cockpit over the ends of the panels and along the bottom of the craft to the other end of the cockpit, said second strip being adapted to be tautened and remain taut when the craft is set up for use in the water, and said second strip being fastened to the outer surfaces of the deck and bottom panels and hingedly joining said deck and bottom panels of the two sections at their inner lateral edges, and means for bowing said panels both laterally and longitudinally and also for tautening said second strip to set up the craft for use in the water.

2. A marine craft comprising a collapsible hull; said hull comprising a pair of symmetrical sections each of which consists of a pliable deck panel and a pliable bottom panel, a lateral inner edge on each of said deck and said bottom panels, retractable means disposable in said hull for setting up the craft for use in the water and for simultaneously bracing said panels transversely and vertically, and a single flexible joint connecting the inner edges of said panels longitudinally and on a medial line of the craft; said joint comprising a strip of water-impervious fabric secured to the outer surfaces of said panels adjacent said inner edges, said fabric being tautened and said inner edges being spread apart when the craft is set up for use in the water and said fabric being slackened and said inner edges being brought adjacent to one another when the hull is collapsed.

3. A marine craft comprising a collapsible hull; said hull comprising a pair of symmetrical sections each of which consists of a deck panel and a bottom panel; said deck panels each having an inner edge and a rounded, outer edge and said bottom panels each having an inner edge and a rounded outer edge, a first keel fitted to the outer surface of one of said bottom panels adjacent its inner edge, a second keel fitted to the outer surface of the other of said bottom panels adjacent its inner edge, a first strip of flexible, water-impervious fabric spanning said keels and adhesively secured to the outer surfaces of said bottom panels to provide a water-tight joint between said panels; said first strip extending longitudinally of said hull throughout the lengths of said bottom panels, over the ends thereof and over portions of the lengths of the deck panels and adhesively secured to the outer surfaces of said deck panels adjacent their inner edges, a second strip of flexible, water-impervious fabric adhesively secured to the outer surfaces of the deck and bottom panels of each section adjacent the outer, rounded edges thereof to provide a water-tight joint therebetween; said second strip extending around the hull over each end of the craft, and retractable means disposable in said hull for simultaneously bracing the hull transversely and vertically and also for tautening said first strip; said means serving to set up the craft for use in the water and when retracted permitting the collapse of the craft.

4. A collapsible marine craft of the character described comprising a pair of collapsible sections flexibly joined together to form a hull; each of said sections being composed of a pair of pliable panels, lateral outer edges on said panels, a hinge consisting of a single flexible strip fastened to the outer surfaces of the panels and connecting the adjacent lateral outer edges of each pair of panels, lateral inner edges on said panels, retractable spreaders adapted to be positioned adjacent the ends of the hull to set up the craft for use in the water, whereby said inner lateral edges of said panels are spread away from each other, and a single joint consisting of a relatively wide flexible strip fastened to the outer surfaces of said panels at said lateral inner edges and connecting the two sections of the hull along said lateral inner edges of said panels on a vertical longitudinal medial line of the craft.

5. A folding marine craft having a maximum amount of bulk, buoyancy and stability when set up and in use in the water for its size, weight and compactness, said craft comprising a hull consisting of a pair of collapsible sections each of which consists of a pair of pliable panels, inner and outer lateral edges on said panels, a first flexible strip fastened to the outer surfaces of the panels of each section at their adjacent outer lateral edges for flexibly joining the panels of the craft on a gunwale line of the hull, a second flexible strip fastened to the outer surfaces of the panels at their inner lateral edges for flexibly joining the panels of the craft on a longitudinal medial line of the hull, and means for simultaneously moving said inner edges apart and tautening said second strip to set up the craft for use in the water.

6. In a folding marine craft having a pair of collapsible sections forming the hull of the craft and each consisting of a pair of pliable panels, inner lateral edges on said panels, a flexible strip fastened to the outer surfaces of said panels at their inner edges for joining the sections of the craft on a longitudinal medial line of the hull, and means disposable in said hull for simultaneously moving said inner edges of said panels radially apart and tautening said strip to set up the craft for use in the water.

7. A collapsible marine craft of the character described comprising a pair of foldable sections flexibly connected together and forming the hull of the craft; each of said sections consisting of a pliable deck panel and a pliable bottom panel, an inner lateral edge and an outer lateral edge on each of said panels, a first flexible strip fastened to the outer surfaces of the deck and bottom panels of each section at their adjacent outer lateral edges and hingedly joining the deck and bottom panels along the gunwale line of the hull, a second flexible strip fastened to the outer surfaces of the deck and bottom panels at their inner lateral edges and hingedly joining the panels on a longitudinal medial line of the hull, and retractable means in the hull for spreading the inner edges of the four panels radially away from a longitudinal medial line through the hull and thereby setting up the craft for use in the water; said retractable means serving to tauten said second strip and to maintain said second strip in a tautened condition while the craft is in the water.

8. A folding marine craft comprising a pair of sections flexibly hinged together to form the hull of the craft; each of said sections consisting of a pair of pliable panels, inner lateral edges on said panels, a flexible strip fastened to the outer surfaces of said panels at their inner edges for joining the sections of the craft on a longitudinal medial line of the hull; said strip being adapted to be tautened and maintained taut while the craft is in use in the water, and retractable means in the hull for tautening said strip and for maintaining said strip in a tautened condition while the craft is in the water.

9. A folding marine craft comprising a hull having a pair of collapsible sections each of which comprises a pair of panels, lateral inner edges on said panels, a flexible strip fastened to said panels at their inner edges for joining the sections of the craft on a longitudinal medial line of the hull; said strip being adapted to be tautened and maintained taut while the craft is in the water, and means disposable in the hull for tautening said strip and for maintaining said strip in a tautened condition while the craft is in the water.

10. A folding marine craft comprising a hull having a pair of collapsible sections each of which comprises a pair of panels, lateral outer rounded edges on said panels, inner lateral edges on said panels flexibly joined together, means on the outer rounded edges for hingedly joining adjacent outer edges of said panels together, and means disposable in said hull for moving said panels radially apart for setting up the craft for use in the water.

11. A marine craft comprising a hull formed of four resilient normally flat panels hingedly connected together to enable folding of the craft as well as setting up the same for use in water, and retractable means for twisting each of said panels to a predetermined angle with respect to the horizontal adjacent its longitudinal center so that it is inclined to the horizon at a lesser angle than said predetermined angle at its longitudinal extremities.

12. A marine craft comprising two symmetrical sections each of which consists of a normally flat resilient deck panel and a normally flat resilient bottom panel hinged thereto, said bottom panels being hingedly interconnected to form a keel line and retractable means for twisting the deck and bottom panels of each section so that adjacent panels are inclined at a predetermined angle with respect to the horizontal while at their longitudinal extremities the panels are inclined to the horizon at an appreciably less degree than said predetermined angle.

13. In a marine craft, a hull formed of at least four joined normally flat resilient panels divided into symmetrical pairs positioned on each side of a vertical plane passing through a keel line, said keel line being formed at the junction of the bottom panel of each pair, and retractable means for twisting each of said panels gradually and uniformly from its longitudinal center outwardly to its opposite ends so that the longitudinal extremities of each panel lie in substantially the same plane which is nearly horizontal while adjacent to its longitudinal center each panel is appreciably inclined with respect to the horizontal.

14. In a marine craft, a hull formed of four normally flat resilient panels, two of said panels being hingedly connected along a straight line forming the keel line of said craft, and together forming the bottom of said craft, hinge means for connecting the outer edges of said two bottom panels to the outer edges of said two remaining panels, said two remaining panels having their inner edges hingedly connected over portions thereof adjacent the ends of said craft, said latter two panels having the remainder of their inner edges cut away to form a body opening, and retractable means for forcing said top and bottom panels apart adjacent said body opening to form a floatable hull.

CHARLES HASKELL CLARK.